(12) United States Patent
Vasudevan et al.

(10) Patent No.: US 9,078,025 B2
(45) Date of Patent: Jul. 7, 2015

(54) USING COMPANION ADS IN ADLITE RICH MEDIA

(75) Inventors: Sudharsan Vasudevan, Sunnyvale, CA (US); Suhas Sadanandan, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 158 days.

(21) Appl. No.: 13/186,300

(22) Filed: Jul. 19, 2011

(65) Prior Publication Data
US 2013/0024887 A1    Jan. 24, 2013

(51) Int. Cl.
| | |
|---|---|
| H04N 21/81 | (2011.01) |
| H04N 21/2343 | (2011.01) |
| H04N 21/44 | (2011.01) |
| H04N 21/262 | (2011.01) |
| G06Q 30/02 | (2012.01) |
| G11B 27/034 | (2006.01) |
| H04N 21/854 | (2011.01) |
| H04N 21/24 | (2011.01) |
| H04N 21/242 | (2011.01) |
| H04N 21/2662 | (2011.01) |

(52) U.S. Cl.
CPC ....... *H04N 21/262* (2013.01); *H04N 21/23439* (2013.01); *H04N 21/44016* (2013.01); *G06Q 30/0241* (2013.01); *G11B 27/034* (2013.01); *H04N 21/854* (2013.01); *H04N 21/2402* (2013.01); *H04N 21/242* (2013.01); *H04N 21/2662* (2013.01); *H04N 21/812* (2013.01)

(58) Field of Classification Search
CPC ......... H04N 21/812; H04N 21/23439; H04N 21/262; H04N 21/44016; H04N 21/25833
USPC ........................................... 725/32, 95
See application file for complete search history.

(56) References Cited

U.S. PATENT DOCUMENTS

| | | | | |
|---|---|---|---|---|
| 7,890,971 | B2 * | 2/2011 | Haberman et al. | 725/35 |
| 2002/0159632 | A1 | 10/2002 | Chui et al. | |
| 2002/0194589 | A1 * | 12/2002 | Cristofalo et al. | 725/32 |
| 2003/0009758 | A1 * | 1/2003 | Townsend et al. | 725/39 |
| 2007/0124769 | A1 * | 5/2007 | Casey et al. | 725/46 |
| 2007/0203840 | A1 * | 8/2007 | Liu | 705/51 |
| 2008/0010076 | A1 | 1/2008 | McMahon et al. | |
| 2008/0071594 | A1 * | 3/2008 | Morin | 705/7 |
| 2009/0006199 | A1 * | 1/2009 | Wang | 705/14 |

(Continued)

FOREIGN PATENT DOCUMENTS

JP    4261749 B2    4/2009

OTHER PUBLICATIONS

U.S. Appl. No. 13/186,330, filed Jul. 19, 2011, Mahajan Sudha et al.

(Continued)

*Primary Examiner* — Ricky Chin
(74) *Attorney, Agent, or Firm* — Mauriel Kapouytian Woods LLP; Lana Akopyan; James Woods

(57) ABSTRACT

The present invention provides techniques relating to rich media advertising. Techniques are provided in which an advertiser-provided image-based component of an advertisement creative is matched with an advertiser-provided audio component of the advertisement creative. A rich media advertisement may be served that includes the image-based component and a synchronously presented audio component. The image-based component and the audio-based component may be elements of a companion advertisement.

20 Claims, 11 Drawing Sheets

(56) References Cited

U.S. PATENT DOCUMENTS

| | | | |
|---|---|---|---|
| 2009/0287572 A1* | 11/2009 | Whelan | 705/14.55 |
| 2009/0313318 A1* | 12/2009 | Dye et al. | 709/202 |
| 2010/0227630 A1 | 9/2010 | Takala et al. | |
| 2011/0015992 A1* | 1/2011 | Liffiton et al. | 705/14.46 |
| 2011/0178854 A1* | 7/2011 | Sofer et al. | 705/14.4 |
| 2011/0178878 A1* | 7/2011 | Ballout | 705/14.69 |
| 2013/0191228 A1* | 7/2013 | Riley et al. | 705/14.73 |

OTHER PUBLICATIONS

U.S. Appl. No. 13/186,347, filed Jul. 19, 2011, Suhas Sudanandan et al.

International Search Report and Written Opinion issued in International Patent Application No. PCT/US2012/045734 dated Jan. 29, 2013.

Office Action issued in Taiwanese Patent Application No. 101125329 dated Oct. 3, 2014.

* cited by examiner

500

502 using one or more computers, obtaining from an advertiser a rich media advertisement creative, the rich media advertisement creative including an image-based component, including one or more images, and an audio component, including obtaining from the advertiser the image-based component and obtaining from the advertiser the audio component

504 using one or more computers, serving a rich media advertisement for presentation on a user computer, in which the rich media advertisement includes the image-based component and the audio component, in which presentation of the image-based component is timed to be synchronized with presentation of the audio component, in which advertising utilizing the rich media advertisement is provided as an option to an advertiser to advertising utilizing a video advertisement, in which the option is at least in part for targeting lower bandwidth users than users targeted with one or more video advertisements, in which the audio component is a companion audio component to the image-based component, in which the image-based component includes a series of images for sequential display, and in which serving the rich media advertisement includes serving the series of images such that each of the images in the sequence is timed to coincide with matching portions of the audio component, and in which providing the option to the advertiser includes providing the advertiser with an opportunity for easier creation of an advertisement creative relative to creation of a counterpart video advertisement creative

FIG. 5

USING COMPANION ADS IN ADLITE RICH MEDIA

BACKGROUND

Rich media, and particularly video content and advertising, has generally been found to be more engaging and effective in eliciting user response than, for instance, standard graphical content and advertising.

Video content and advertising, however, has a number of drawbacks or potential drawbacks. For example, video is generally very heavy in terms of data and required bandwidth, which can cause downloading delays and other problems, especially for downloading or delivery to lower bandwidth users. Additionally, downloading of a video player can be time-consuming. Furthermore, video content and advertising can be difficult and time-consuming to create.

There is a need, for example, for content and advertising that provides a high degree of user engagement and high user response rates while avoiding drawbacks associated with video content and advertising.

SUMMARY

Some embodiments of the invention provide systems and methods relating to rich media advertising. Techniques are provided in which an advertiser-provided image-based component of an advertisement creative is matched with an advertiser-provided audio component of the advertisement creative. A rich media advertisement may be served that includes the image-based component and a synchronously presented audio component. The image-based component and the audio-based component may be elements of a companion advertisement.

In some embodiments, utilization of the rich media advertisement may be provided as an option to an advertiser to advertising utilizing a video advertisement, such as an option that may be used to target lower bandwidth users.

In some embodiments, presentation of the rich media advertisement on a user computer may not require downloading or utilization of a video player.

BRIEF DESCRIPTION OF THE DRAWINGS

FIG. 5 is a flow diagram illustrating a method according to one embodiment of the invention;

While the invention is described with reference to the above drawings, the drawings are intended to be illustrative, and the invention contemplates other embodiments within the spirit of the invention.

DETAILED DESCRIPTION

Figure 1:
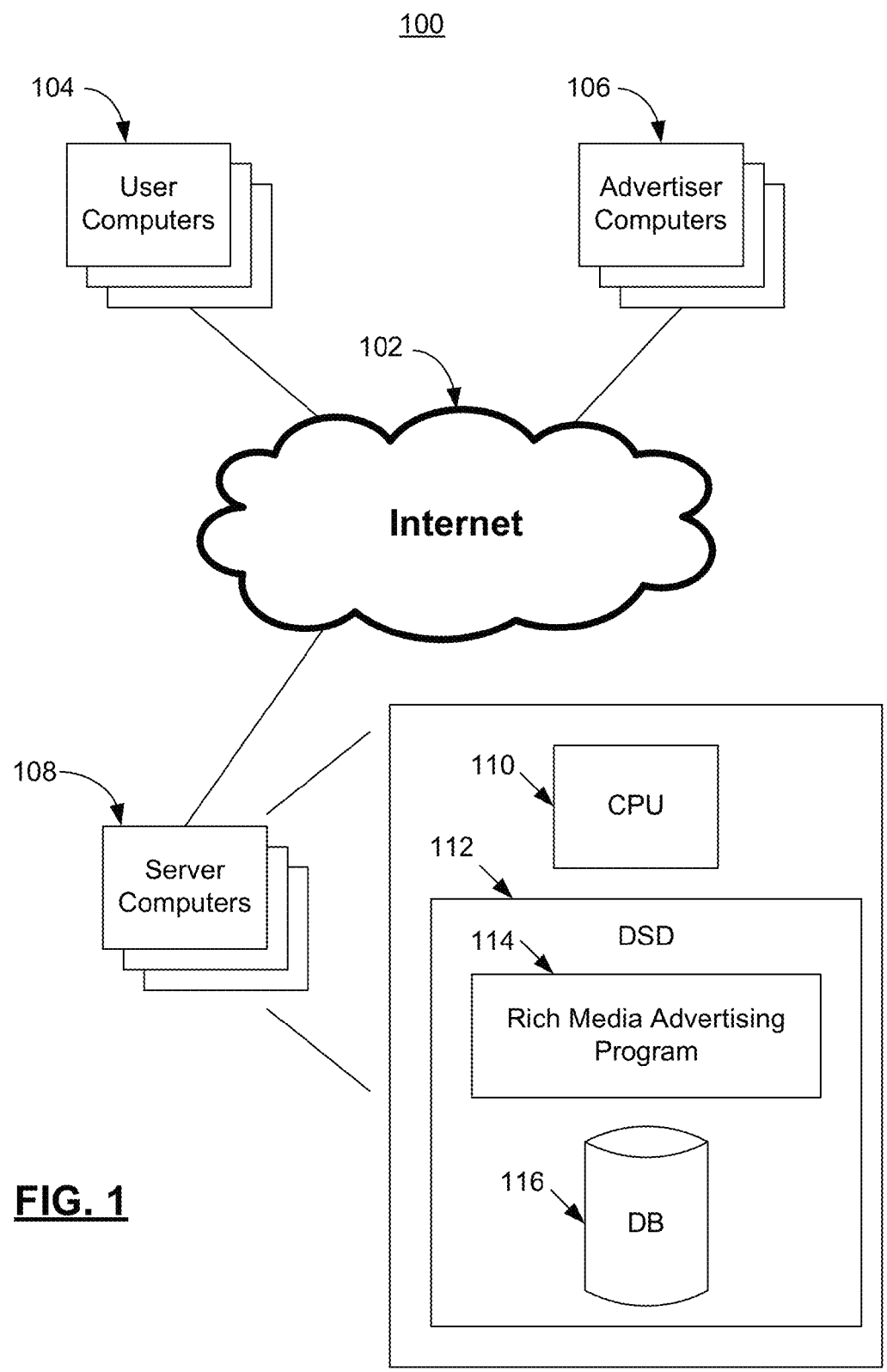
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, smart phone, PDAs, tablets, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, coupon-related advertisements, group-related advertisements, social networking-related advertisements, etc.

As depicted, each of the server computers 108 includes one or more CPUs 110 and a data storage device 112. The data storage device 112 includes a database 116 and a Rich Media Advertising Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
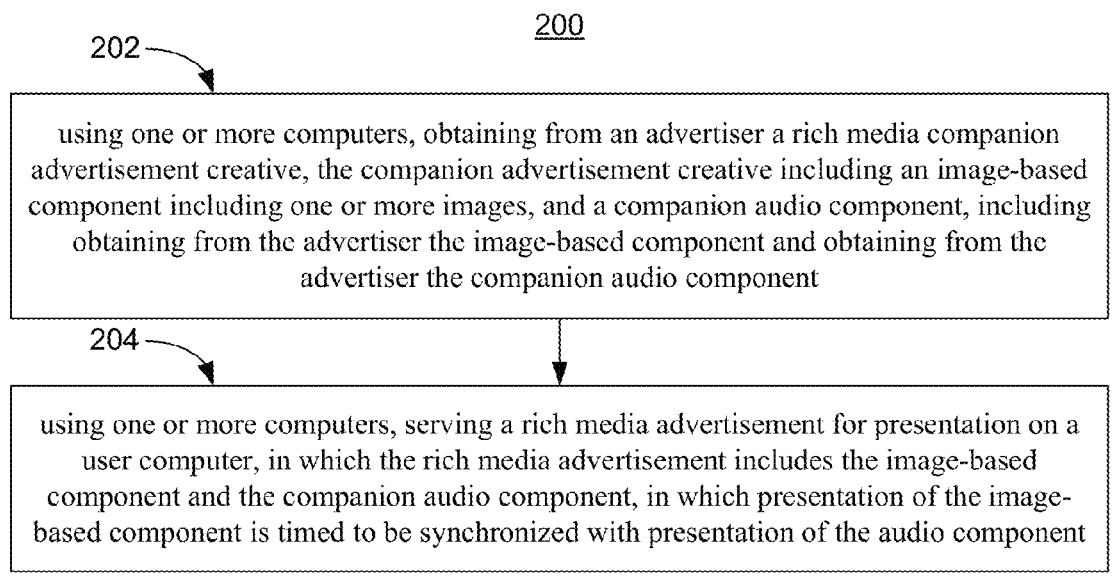
FIG. 2 is a flow diagram illustrating a method according to one embodiment of the invention.

FIG. 2 is a flow diagram illustrating a method 200 according to one embodiment of the invention. At step 202, the method 200 includes, using one or more computers, obtaining from an advertiser a rich media companion advertisement creative, the companion advertisement creative including an image-based component including one or more images, and a companion audio component, including obtaining from the advertiser the image-based component and obtaining from the advertiser the companion audio component.

At step 204, the method 200 includes, using one or more computers, serving a rich media advertisement for presentation on a user computer, in which the rich media advertisement includes the image-based component and the companion audio component, and in which presentation of the image-based component is timed to be synchronized with presentation of the audio component.

Figure 3:
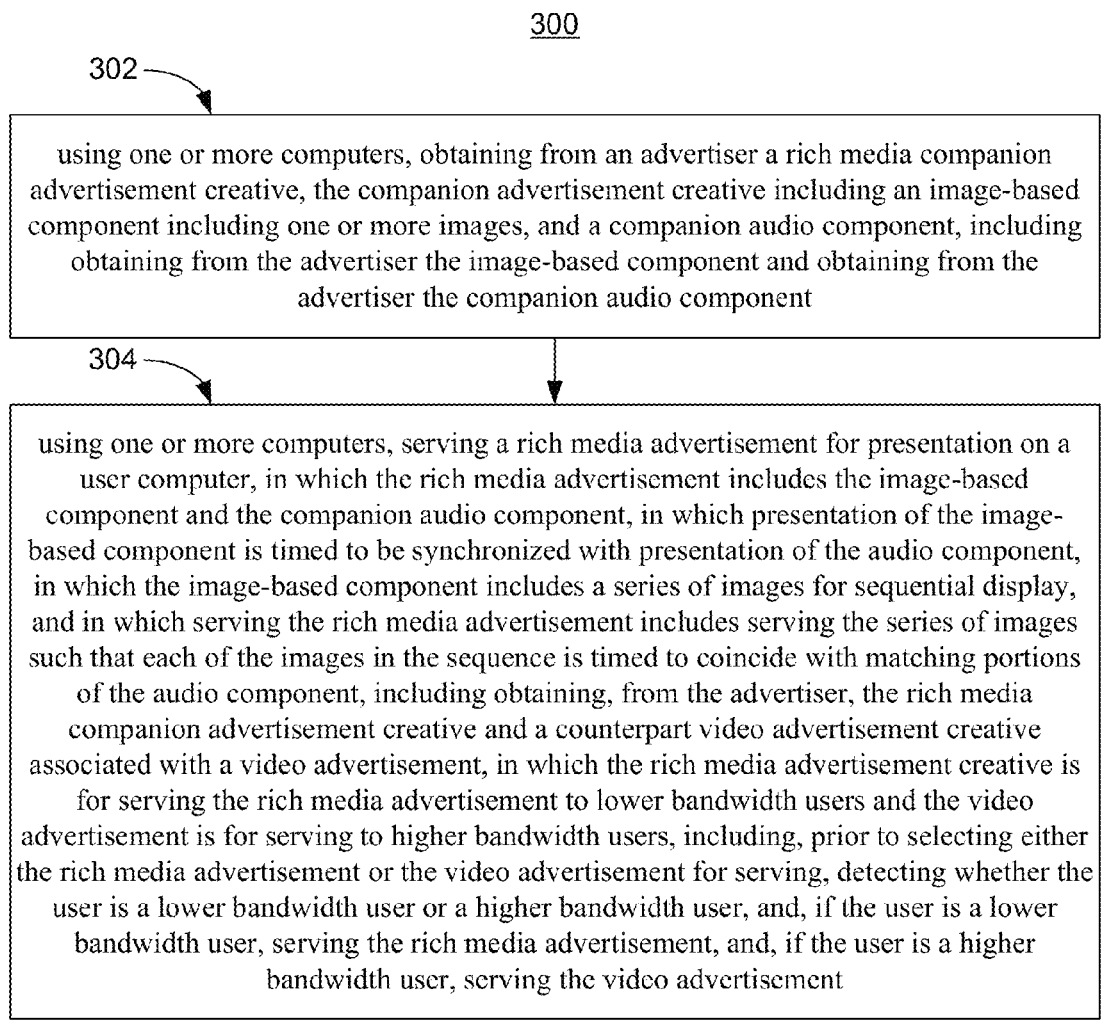
FIG. 3 is a flow diagram illustrating a method according to one embodiment of the invention.

FIG. 3 is a flow diagram illustrating a method 300 according to one embodiment of the invention. At step 302, the method includes, using one or more computers, obtaining from an advertiser a rich media companion advertisement creative, the companion advertisement creative including an image-based component including one or more images, and a companion audio component, including obtaining from the advertiser the image-based component and obtaining from the advertiser the companion audio component.

At step 304, the method 300 includes, using one or more computers, serving a rich media advertisement for presentation on a user computer, in which the rich media advertisement includes the image-based component and the companion audio component, in which presentation of the image-based component is timed to be synchronized with presentation of the audio component. The image-based component includes a series of images for sequential display, and in which serving the rich media advertisement includes serving the series of images such that each of the images in the sequence is timed to coincide with matching portions of the audio component. The method 300 includes obtaining, from the advertiser, the rich media companion advertisement creative and a counterpart video advertisement creative associated with a video advertisement. The rich media advertisement creative is for serving the rich media advertisement to lower bandwidth users and the video advertisement is for serving to higher bandwidth users. The method 300 further includes, prior to selecting either the rich media advertisement or the video advertisement for serving, detecting whether the user is a lower bandwidth user or a higher bandwidth user, and, if the user is a lower bandwidth user, serving the rich media advertisement, and, if the user is a higher bandwidth user, serving the video advertisement. It is to be noted that, while some embodiments are described herein in which the rich media ads are shown to lower bandwidth users, other embodiments are contemplated. For example, in some embodiments, an advertiser may choose for the rich media ads to be shown to both low bandwidth and high bandwidth users, or to any users.

Figure 4:
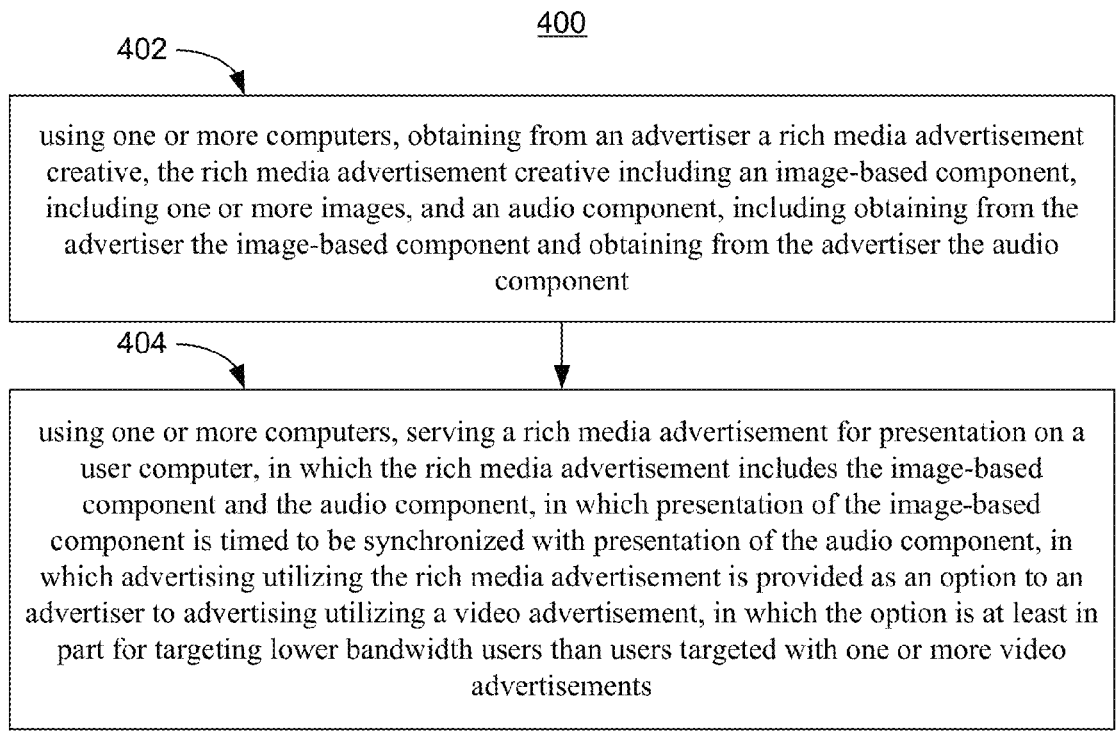
FIG. 4 is a flow diagram illustrating a method according to one embodiment of the invention.

FIG. 4 is a flow diagram illustrating a method 400 according to one embodiment of the invention. Step 402 includes, using one or more computers, obtaining from an advertiser a rich media advertisement creative, the rich media advertisement creative including an image-based component, including one or more images, and an audio component, including obtaining from the advertiser the image-based component and obtaining from the advertiser the audio component.

Step 404 includes, using one or more computers, serving a rich media advertisement for presentation on a user computer, in which the rich media advertisement includes the image-based component and the audio component, in which presentation of the image-based component is timed to be synchronized with presentation of the audio component. Advertising utilizing the rich media advertisement is provided as an option to an advertiser to advertising utilizing a video advertisement, in which the option is at least in part for targeting lower bandwidth users than users targeted with one or more video advertisements.

FIG. 5 is a flow diagram illustrating a method 500 according to one embodiment of the invention. At step 502, the method 500 includes, using one or more computers, obtaining from an advertiser a rich media advertisement creative, the rich media advertisement creative including an image-based component, including one or more images, and an audio component, including obtaining from the advertiser the image-based component and obtaining from the advertiser the audio component.

At step 504, the method 500 includes, using one or more computers, serving a rich media advertisement for presentation on a user computer, in which the rich media advertisement includes the image-based component and the audio component, in which presentation of the image-based component is timed to be synchronized with presentation of the audio component. Advertising utilizing the rich media advertisement is provided as an option to an advertiser to advertising utilizing a video advertisement, in which the option is at least in part for targeting lower bandwidth users than users targeted with one or more video advertisements. The audio component is a companion audio component to the image-based component. The image-based component includes a series of images for sequential display. Serving the rich media advertisement includes serving the series of images such that each of the images in the sequence is timed to coincide with matching portions of the audio component. Providing the option to the advertiser includes providing the advertiser with an opportunity for easier creation of an advertisement creative relative to creation of a counterpart video advertisement creative.

Figure 6:
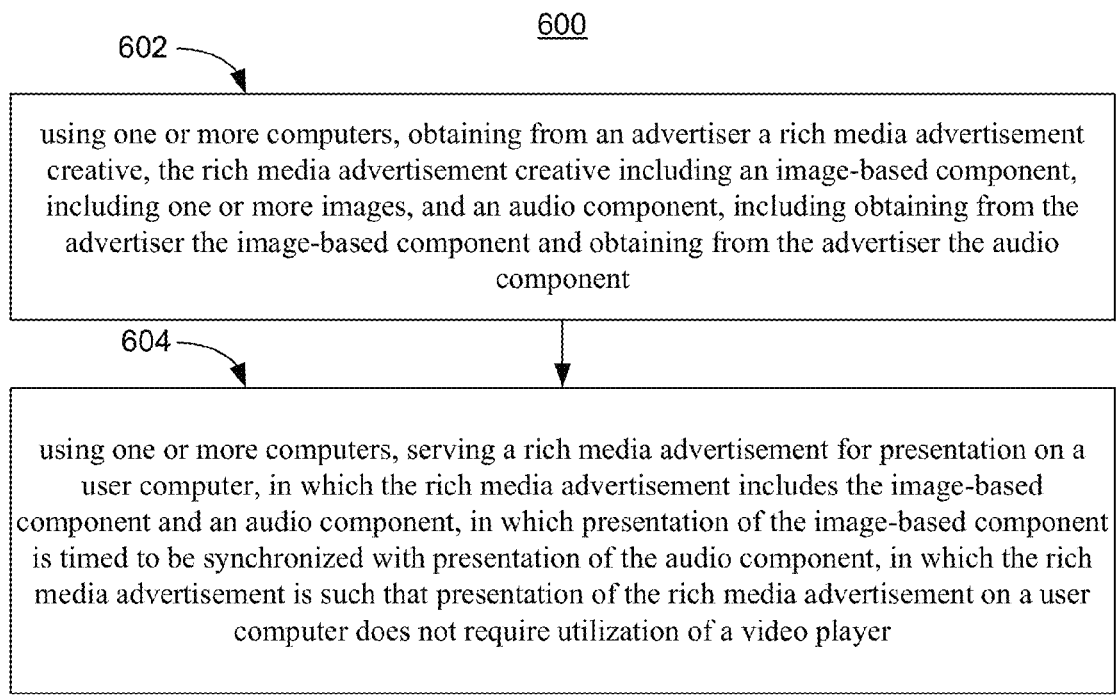
FIG. 6 is a flow diagram illustrating a method according to one embodiment of the invention.

FIG. 6 is a flow diagram illustrating a method 600 according to one embodiment of the invention. At step 602, the method 600 includes, using one or more computers, obtaining from an advertiser a rich media advertisement creative, the rich media advertisement creative including an image-based component, including one or more images, and an audio component, including obtaining from the advertiser the image-based component and obtaining from the advertiser the audio component.

At step 604, the method 600 includes, using one or more computers, serving a rich media advertisement for presentation on a user computer, in which the rich media advertisement includes the image-based component and an audio component, in which presentation of the image-based component is timed to be synchronized with presentation of the audio component, in which the rich media advertisement is such that presentation of the rich media advertisement on a user computer does not require utilization of a video player.

Figure 7:
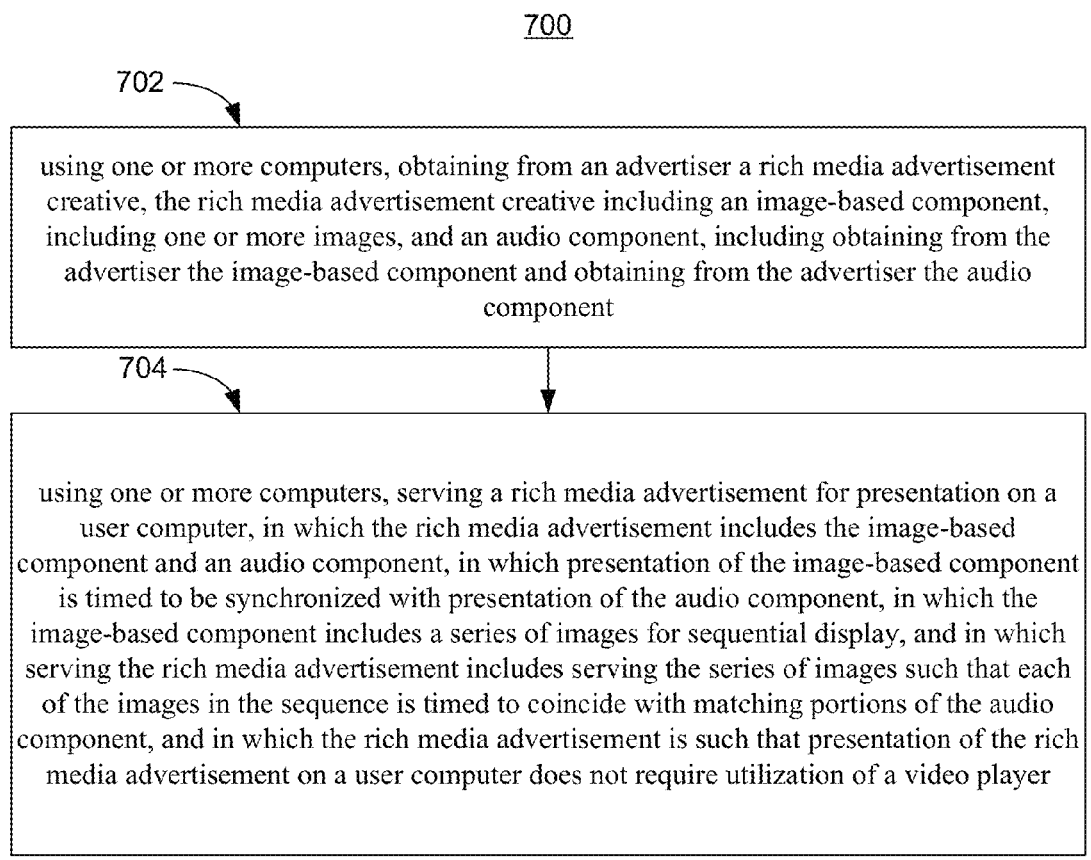
FIG. 7 is a flow diagram illustrating a method according to one embodiment of the invention.

FIG. 7 is a flow diagram illustrating a method 700 according to one embodiment of the invention. At step 702, the method 700 includes, using one or more computers, obtaining from an advertiser a rich media advertisement creative, the rich media advertisement creative including an image-based component, including one or more images, and an audio component, including obtaining from the advertiser the image-based component and obtaining from the advertiser the audio component.

At step 704, the method 700 includes, using one or more computers, serving a rich media advertisement for presentation on a user computer, in which the rich media advertisement includes the image-based component and an audio component, in which presentation of the image-based component is timed to be synchronized with presentation of the audio component. The image-based component includes a series of images for sequential display. Serving the rich media advertisement includes serving the series of images such that each of the images in the sequence is timed to coincide with matching portions of the audio component. The rich media advertisement is such that presentation of the rich media advertisement on a user computer does not require utilization of a video player.

Figure 8:
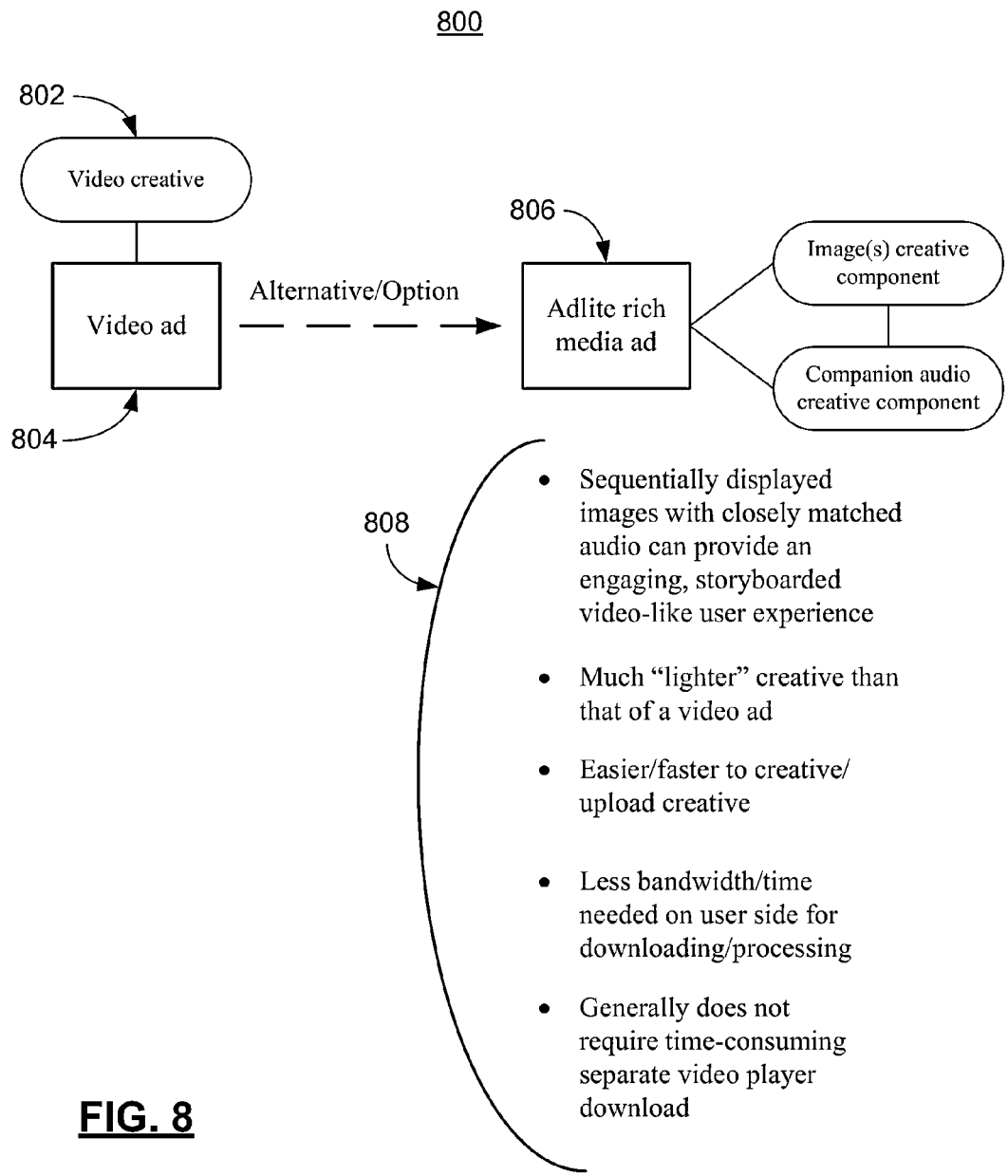
FIG. 8 is a block diagram illustrating one embodiment of the invention.

FIG. 8 is a block diagram 800 illustrating one embodiment of the invention. Block 804 represents a video ad. Block 802 represents an associated video ad creative, such as, for example, a video, video content, or parameters or characteristics of such, that an advertiser may designate, provide, or upload for the video ad.

Rich media ads according to embodiments of the invention are herein sometimes referred to as Adlite ads. Block 806 represents an Adlite ad according to one embodiment of the invention. Also depicted are components of the creative associated with the rich media ad, including an image-based component, which may include one or more images, and an audio component. In some embodiments, Adlite ads according to embodiments of the invention may be an option or alternative to video ads.

As represented by block 808, an Adlite ad may have a number of advantages, such as relative to counterpart video advertisements. For example, Adlite ads may provide sequentially displayed images with closely matched audio that can provide an engaging, storyboarded video-like user experience. Adlite ads may also be much "lighter", in terms of data, than video ads. Furthermore, Adlite ads, including creatives, may be easier and faster to design, create, or upload to an ad system than video ads, including creatives. Moreover, Adlite ads may provide advantages from a user or client-side perspective as well. For example, Adlite ads may require less bandwidth in terms of data rates, be faster to download, or be less processing-intensive to present than video ads. Furthermore, presentation of Adlite ads may not require a video player. Instead, for example, an audio component may be presentable using an audio player such as may be built into a browser, and images may be presentable using standard image, image series or slide show presentation techniques that do not require a video player.

Figure 9:
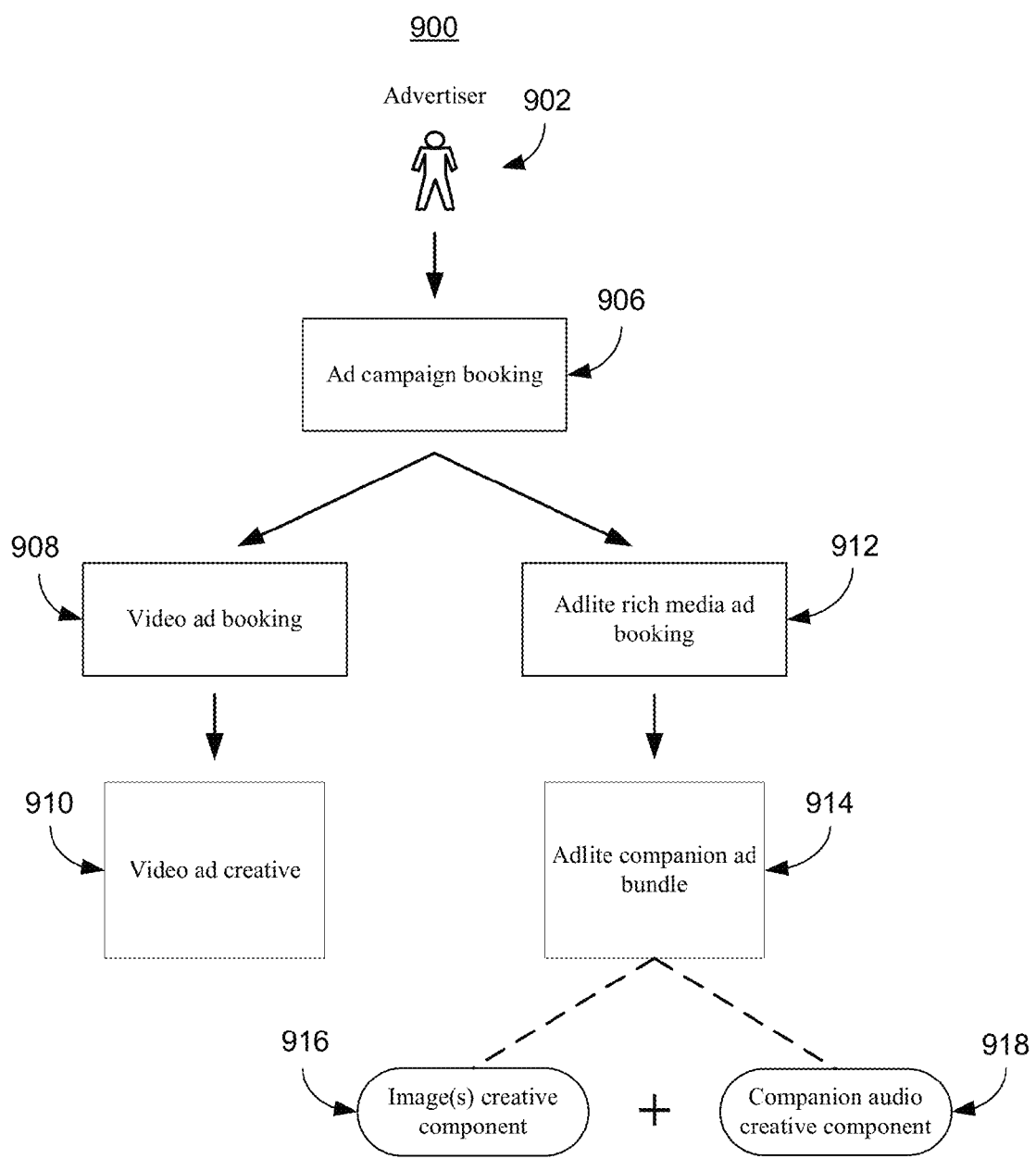
FIG. 9 is a block diagram illustrating one embodiment of the invention.

FIG. 9 is a block diagram 900 illustrating one embodiment of the invention, depicting ad campaign booking 906, such as an advertiser 902 (which can include a proxy or agent of an advertiser) booking one or more ads with an ad system. As depicted, in some embodiments, the advertiser 902 may be able to book both a video ad, as depicted by block 908, or an Adlite rich media ad, as depicted by block 914, or both. Booking the video ad may include booking a video ad creative 910, and booking the Adlite ad may include booking an Adlite ad creative 914. Booking the Adlite ad creative may include booking an Adlite companion ad bundle, which may include an image-based component 916 and a companion audio component 918. Although the audio component is described as a companion to the image-based component, this can alternatively be or include the image-based ad being a companion of the audio component. Generally, the image-based and audio components are elements of a companion advertisement including both components.

In some embodiments, the video ad and the Adlite ad may be counterparts of each other, which can mean, for example, that the video ad and the Adlite ad are substantively intended to be very similar and have similar content and effect, but be in different formats. For example, the Adlite ad may be intended to be served to users with lower bandwidth, whereas the video ad may be intended to be served to users with higher bandwidth.

Figure 10:
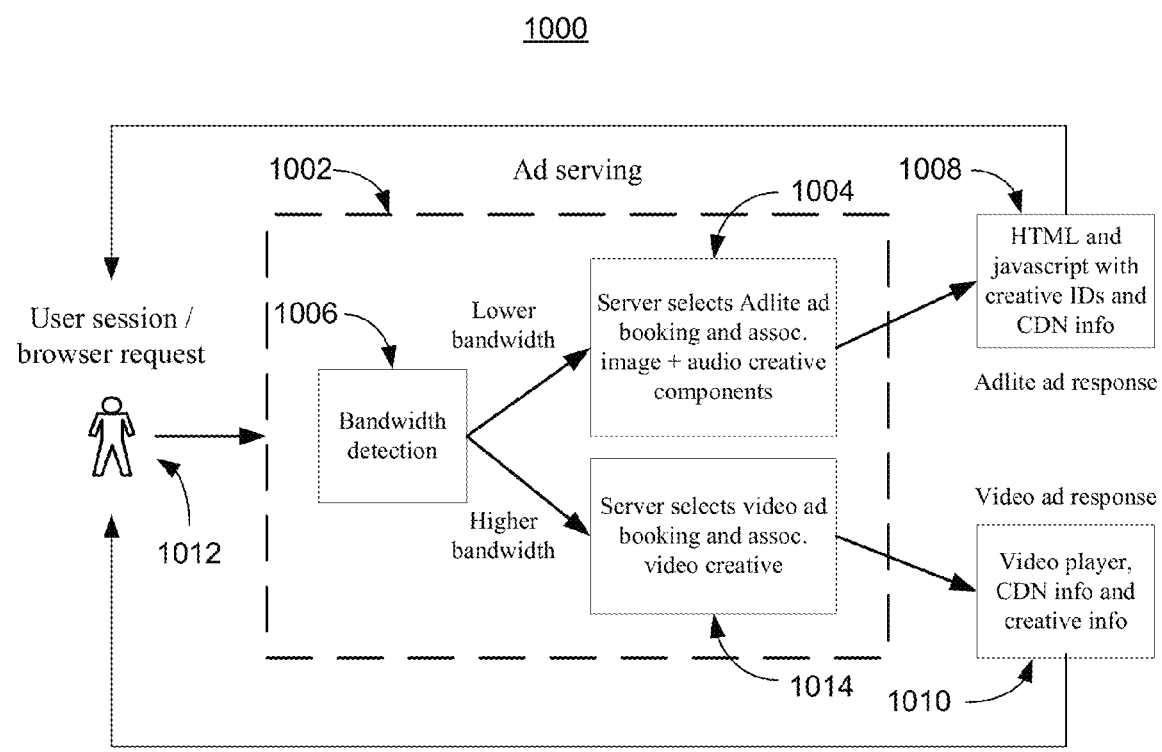
FIG. 10 is a block diagram illustrating one embodiment of the invention.

FIG. 10 is a block diagram 1000 illustrating one embodiment of the invention. Block 1012 represents a browser or user session request for an ad. Ad serving 1002 is also depicted, and may be implemented using one or more server computers.

As depicted, ad serving 1002 may include detection of user or client bandwidth or bandwidth level or range 1006. If a lower bandwidth or bandwidth level is detected, then ad serving selects Adlite ad booking and associated image and audio ad creative components 1004. If higher bandwidth or bandwidth level is detected, then ad serving selects video ad booking and an associated video ad creative 1014.

If the Adlite option was selected at block 1004, then an Adlite ad serving response 1008 takes place, which may include, for example, utilization of HTML and Javascript with creative or creative component information and content distribution network (CDN) information.

If the video ad option was selected at block 1014, then a video ad serving response 1010 takes place, which may include utilization of CDN and creative information and serving of a video ad for presentation on the client side using a video player.

Figure 11:
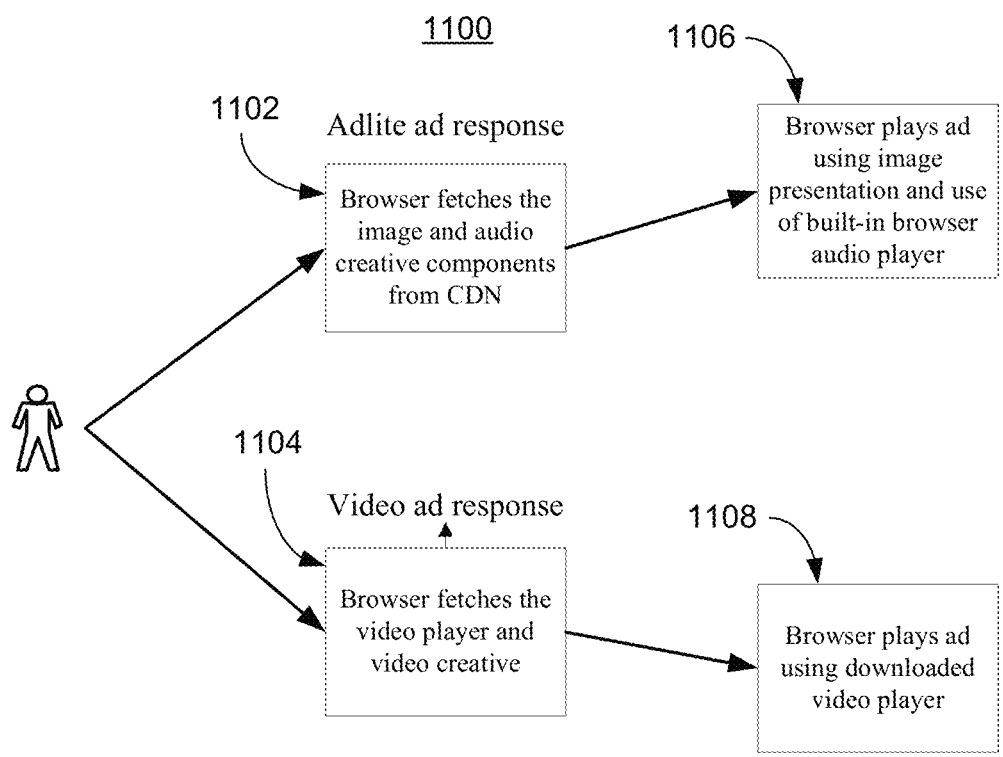
FIG. 11 is a block diagram illustrating one embodiment of the invention.

FIG. 11 is a block diagram 1100 illustrating one embodiment of the invention, which may be associated with ad serving as depicted in FIG. 10. Particularly, block 1102 depicts a selected an Adlite ad response. This may include a client browser fetching the image and audio creative components from the CDN. It may further include the client browser playing, or presenting, the ad 1106, including the image-based and the audio components, which may include using image presentation and audio presentation using of built-in browser audio player.

Block 1104 depicts a selected video ad response. This may include the client browser fetching the video player and video creative. It may also include the browser playing the ad 1108 using a video player that was downloaded prior to ad serving.

In some embodiments, Adlite rich media ads provide an alternative to video advertising. An Adlite ad may provide a level of user engagement and response that is similar to that of a video ad, while providing many advantages over typical video ads and ad scenarios, as mentioned above. These advantages can include easier creation and uploading of creatives by advertisers, faster downloading or playing and less bandwidth requirement on the client side, and an ability for the client to play the ad without need of a video player, for example.

In some embodiments, companion ad techniques may be used in creation and handling of Adlite ads. For example, Adlite ads may be booked and treated as if including essentially two linked ads, or linked creatives. For example, in an ad system, slots may be designated for each ad, Such slots may typically include an actual size or unit of a graphical ad, for instance. In Adlite ad booking and treatment, two ad slots may be involved. The first ad slot may be designated for the image-based creative component of an Adlite ad. The second slot may be designated for the audio creative component of the Adlite ad. The second slot may not be associated with an ad size, unit, etc., but may instead be a conceptual slot that serves as a placeholder for the audio ad, and may serve to help link the image-based and audio creative components by being linked to the first slot.

For example, in some embodiments, if Adlite ad booking is selected, an advertiser may first be prompted to upload an image-based creative component. The advertiser may then be prompted and required to upload the companion audio component. In some embodiments, these steps may instead include uploading an audio component followed by a companion image-based component. Furthermore, since the image-based component may include a sequential series of image to be timed to be synchronized with portions of the audio creative, the advertiser may be required to designate images and associated audio portions, etc. Such sequencing and synchronization may help enable producing a storyboarded, video like effect.

Furthermore, in some embodiments, an Adlite ad and a counterpart video ad may be booked by an advertiser. The Adlite ad may be utilized if client bandwidth is detected to be lower, while the video ad may be utilized if the client bandwidth is detected to be higher. The Adlite ad and the video ad may different media type or format versions of essentially the same ad concept, for example.

In some embodiments, Adlite ads provide a rich ad format, which may provide users with an engaging ad experience while using standard graphical creatives and an audio creative type, instead of using video creatives, which are generally much heavier. This may include matching an image or an image series with a high quality audio clip to provide an engaging, online video-like experience, for example.

Some embodiments of the invention include a recognition that, generally unlike video ads, standard image ads have limited capability of telling a compelling story to users. Rich ads and video ads, and particularly video ads, however, have much higher conversion rates and are more engaging than standard graphical ad formats. However, video ad creatives are generally orders of magnitude larger in size (heavier) than standard graphical ads. Furthermore, video ads are generally more expensive or time consuming to create. In some embodiments, Adlite ads provide many advantages of video ads while avoiding many of the disadvantages.

In some embodiments, an Adlite ad contains an image-based component, such as in the format of a standard graphical ad or ads with a few or more animated slides, as well as an audio component. The audio component may be high quality, and may be compressed or compressible, and the images may also be compressible or compressed. The audio component is a companion ad or companion creative for the image-based component, or vice-versa.

In some embodiments, during booking, when an advertiser is creating an ad campaign, the advertiser is provided with an option to create an Adlite ad, such as by first creating a component including a standard graphical ad or ad type, and then linking it to a created or specified companion audio ad, ad creative, or ad creative component. At ad serving, for example, when an ad-call comes to the advertising server, an Adlite ad may be served (standard graphical+audio companion), giving a video-ad like experience. A slideshow image-based component, in a standard graphical ad format, for example, may be closely or synchronously tied to the audio, such that it helps the advertiser to tell a compelling story, which may achieve an engagement level similar to that of a video ad.

In some embodiments, the Adlite format will enable, for example, increased the coverage of rich ads in display markets. Furthermore, the Adlite ad may be easier to create than a standard video ad. Adlite ads can provide a solution for advertisers that is cost-effective and yet maintains high engagement and performance levels.

In some embodiments, Adlite ads can provide a solution for use in targeting lower-bandwidth users and networks, such as may be prevalent in emerging world markets, for instance. For example, in emerging world markets, downloading speeds may be dramatically slower than in more developed markets, such as orders of magnitude slower.

Several disadvantages may be associated with video ads. For example, since video ad creatives are generally orders of magnitude larger in data size than standard graphical ads, downloading a video ad may take a proportionally large amount of time in lower bandwidth networks. Furthermore, video ads generally require a video player to be downloaded, before the creative can be played in the browser. Downloading the video player may also takes a significant amount of time, particularly in slower networks, such as may be present in emerging world markets. As such, standard graphical ads are often utilized in such markets, but are generally not as engaging as video ads.

Video ads and their presentation may typically involve elements including the visual video component, the audio component, and a video player. Of these, the video visual video component is usually the heaviest, in terms of size and necessary bandwidth use.

Generally, problems faced while serving video ads in low bandwidth areas include the following. Downloading the video ad may take noticeable amount of time, adversely affecting user experience, often causing a user to just leave the page. Also, downloading the video player itself takes a significant amount of time, adding to user experience degradation. Notably, high latency, such as in page load, tends to result in user frustration, causing users to leave pages, which can result in lower page views and, ultimately, lower click throughs, conversions, and other ad performance metrics.

One method that has been attempted to mitigate video ad problems is compressing the video creative. However, generally, the visual video component cannot be compressed significantly without a proportional loss in quality. Generally, available compression technology cannot compress the visual video creatives to, for example, sizes that can be tolerated on dial-up networks or other slow networks. Lower video quality due to compression, coupled with higher page load time due to the need for downloading the video player, can lead to substantially lower user engagement, ad performance, and revenue. In some embodiments, Adlite ads provide a solution, such as by providing a video-like ad experience while avoiding many disadvantages associated with video ads.

In some embodiments, during booking, such as when an advertiser is creating a video ad campaign, the advertiser is provided with an option to create an Adlite ad. The Adlite ad may include a standard graphical format image-based component plus a companion audio component, such as in addition to a counterpart video ad, but may be targeted to low bandwidth users.

In some embodiments, during ad-serving time, such as when an ad call comes to the advertising server, ad serving first detects the user's bandwidth. If the bandwidth is high or high enough, the video ad may be selected and served. However, if the bandwidth is low or low enough, the Adlite ad may be served instead.

In some embodiments, Adlite ads provide several advantages. In some embodiments, no video player needs to be downloaded at the client/browser. Generally, standard browsers include an inbuilt audio player. In some embodiments, an Adlite image-based component, such as a slideshow in standard graphical ad format, can generally be supported by using an image format such as one that supports layering/slideshows (for example, the "GIF" format) or, in some embodiments, through a light client side script, for example.

In some embodiments, the audio component of an Adlite ad creative may be compressed, or may be compressed if necessary or under appropriate circumstances. Adlite audio components may be of high quality, but may be compressed or compressible much more than a visual video creative without significant reduction in quality. Furthermore, compared to a typical video ad, the Adlite format can result a large savings or reduction, such as a ten or fifteen times saving, in overall data size or data-transfer, resulting in advantages which can include faster download and a better user-experience. However, Adlite ads may provide engagement levels similar to that of a video ad, and can, for example, allow the advertiser to tell a compelling story even in lower bandwidth networks.

While the invention is described with reference to the above drawings, the drawings are intended to be illustrative, and the invention contemplates other embodiments within the spirit of the invention.

The invention claimed is:

1. A method comprising:

using one or more computers, providing an advertiser an option to select a rich media advertisement option among other options including a separately displayed option for selecting a non-rich media advertisement, simultaneously on the same display interface screen, during advertisement booking and uploading;

using one or more computers, prompting the advertiser, in response to the advertiser selecting the rich media advertisement option, to upload the rich media companion advertisement creative, the companion advertisement creative comprising an image-based component comprising one or more images, and a companion audio component;

using one or more computers, obtaining from the advertiser the rich media companion advertisement creative, comprising:

obtaining from the advertiser the image-based component, including a series of images configured for sequential display;

obtaining from the advertiser the companion audio component; and obtaining linking information, for the series of images and the companion audio component, designated by the advertiser during the advertisement booking and uploading; and using one or more computers, serving a rich media advertisement for presentation on a user computer, including the image-based component and the companion audio component, such that, during presentation on the user computer, presentation of each portion of the image-based component is timed to be synchronized with presentation of each portion of the audio component, based on the linking information obtained during the advertisement booking and uploading, and such that each of the images in the sequence is timed to coincide with each of a plurality of matching portions of the audio component, based on the linking information obtained during the advertisement booking and uploading.

2. The method of claim 1, wherein obtaining the image-based component comprises obtaining images in a standard graphical advertisement creative format.

3. The method of claim 1, wherein matching portions of the audio component are portions that relate to matching images of the series of images, so that synchronized presentation of the images and the audio component is designed to create a storyboard effect.

4. The method of claim 1, wherein matching portions of the audio component are portions that relate to matching images of the series of images, so that synchronized presentation of the images and the audio component is designed to create a video-like effect.

5. The method of claim 1, wherein the sequential display of the images is timed to coincide with matching portions of the audio component so as to create an engaging and response-evoking experience for a user.

6. The method of claim 1, wherein matching portions of the audio component are portions that relate to matching images of the series of images, so that synchronized presentation of the images and the companion audio component is designed to create a more engaging effect than standard graphical advertisements.

7. The method of claim 1, comprising obtaining, from the advertiser, the rich media companion advertisement creative and a counterpart video advertisement creative associated with a video advertisement, wherein the rich media advertisement creative is for serving the rich media advertisement to lower bandwidth users and the video advertisement creative is for serving the video advertisement to higher bandwidth users.

8. The method of claim 7, comprising, prior to selecting either the rich media advertisement or the video advertisement for serving, detecting whether the user is a lower bandwidth user or a higher bandwidth user, and, if the user is a lower bandwidth user, serving the rich media advertisement, and, if the user is a higher bandwidth user, serving the video advertisement.

9. The method of claim 1, further comprising, during the advertisement booking and uploading, prompting the advertiser to select an option to input the rich media advertisement creative and the counterpart video advertisement creative.

10. The method of claim 1, further comprising, during the advertisement booking and uploading of the rich media advertisement, prompting the advertiser to input the image-based component as one or more standard graphical images, prompting the advertiser to input the counterpart audio component.

11. The method of claim 1, wherein the image-based component is configured to be supported, during presentation on the user computer, by using an image format that supports layering by executing a client side script.

12. The method of claim 1, further comprising, during presentation on the user computer, implementing standard image presentation techniques for presentation of each of the images in the sequence of the served rich media advertisement.

13. The method of claim 10, further comprising, during the advertisement booking and uploading of the rich media advertisement, and after input of the image-based component and input of the counterpart audio component, prompting the advertiser and requiring the advertiser to designate the one or more standard graphical images and the counterpart audio component to be synchronized.

14. A system comprising:

one or more server computers coupled to a network; and one or more databases coupled to the one or more server computers;

wherein the one or more server computers are for:

providing an advertiser an option to select a rich media advertisement option among other options including a separately displayed option for selecting a non-rich media advertisement, simultaneously on the same display interface screen, during advertisement booking and uploading;

prompting the advertiser, in response to the advertiser selecting the rich media advertisement option, to upload the rich media companion advertisement creative, the companion advertisement creative comprising an image-based component, comprising one or more images, and a companion audio component;

obtaining from the advertiser the rich media companion advertisement creative, comprising:

obtaining from the advertiser the image-based component, including a series of images configured for sequential display;

obtaining from the advertiser the companion audio component; and obtaining linking information, for the series of images and the companion audio component, designated by the advertiser during the advertisement booking and uploading; and using one or more computers, serving a rich media advertisement for presentation on a user computer, including the image-based component and the companion audio component, such that, during presentation on the user computer, presentation of each portion of the image-based component is timed to be synchronized with presentation of each portion of the audio component, based on the linking information obtained during the advertisement booking and uploading, and such that each of the images in the sequence is timed to coincide with each of a plurality of matching portions of the audio component, based on the linking information obtained during the advertisement booking and uploading.

15. The system of claim 14, wherein obtaining the image-based component comprises obtaining images in a standard graphical advertisement creative.

16. The system of claim 14, wherein matching portions of the audio component are portions that relate to matching images of the series of images, so that synchronized presentation of the images and the companion audio component is designed to create a storyboard effect.

17. The system of claim 16, wherein matching portions of the audio component are portions that relate to matching images of the series of images, so that synchronized presentation of the images and the companion audio component is designed to create a video-like effect.

18. The system of claim 14, wherein the sequential display of the images is timed to coincide with matching portions of the audio component so as to create an engaging and response-evoking experience for a user.

19. The system of claim 14, wherein matching portions of the audio component are portions that relate to matching images of the series of images, so that synchronized presentation of the images and the companion audio component is designed to create a more engaging effect than standard graphical advertisements.

20. A non-transitory computer readable medium or media containing instructions for executing a method comprising:

using one or more computers, providing an advertiser an option to select a rich media advertisement option among other options including a separately displayed option for selecting a non-rich media advertisement, simultaneously on the same display interface screen, during advertisement booking and uploading;

using one or more computers, prompting the advertiser, in response to the advertiser selecting the rich media advertisement option, to upload the rich media companion advertisement creative, the companion advertisement creative comprising an image-based component, comprising one or more images, and a companion audio component;

using one or more computers, obtaining from the advertiser the rich media companion advertisement creative, comprising:

obtaining from the advertiser the image-based component, including a series of images configured for sequential display;

obtaining from the advertiser the companion audio component; and obtaining linking information, for the series of images and the companion audio component, designated by the advertiser during the advertisement booking and uploading; and using one or more computers, serving a rich media advertisement for presentation on a user computer, including the image-based component and the companion audio component, such that, during presentation on the user computer, presentation of each portion of the image-based component is timed to be synchronized with presentation of each portion of the audio component, based on the linking information obtained during the advertisement booking and uploading, and such that each of the images in the sequence is timed to coincide with each portion of a plurality of matching portions of the audio component, based on the linking information obtained during the advertisement booking and uploading;

obtaining, from the advertiser, the rich media companion advertisement creative and a counterpart video advertisement creative associated with a video advertisement;

wherein the rich media advertisement creative is for serving the rich media advertisement to lower bandwidth users and the video advertisement is for serving to higher bandwidth users; and prior to selecting either the rich media advertisement or the video advertisement for serving, detecting whether the user is a lower bandwidth user or a higher bandwidth user, and, if the user is a lower bandwidth user, serving the rich media advertisement, and, if the user is a higher bandwidth user, serving the video advertisement.

* * * * *